US012793744B2

(12) United States Patent
Luo et al.

(10) Patent No.: US 12,793,744 B2
(45) Date of Patent: Nov. 10, 2026

(54) DATA PROCESSING METHOD, CONTROL APPARATUS, ELECTRONIC DEVICE, AND COMPUTER-READABLE MEDIUM

(71) Applicant: ZTE Corporation, Shenzhen (CN)

(72) Inventors: Yibao Luo, Shenzhen (CN); Jingbo Wei, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 18/874,640

(22) PCT Filed: Mar. 8, 2023

(86) PCT No.: PCT/CN2023/080357
§ 371 (c)(1),
(2) Date: Dec. 13, 2024

(87) PCT Pub. No.: WO2023/241121
PCT Pub. Date: Dec. 21, 2023

(65) Prior Publication Data

US 2025/0372128 A1 Dec. 4, 2025

(30) Foreign Application Priority Data

Jun. 13, 2022 (CN) ........................ 202210662421.5

(51) Int. Cl.
*G11B 27/36* (2006.01)
*G06V 10/62* (2022.01)
(Continued)

(52) U.S. Cl.
CPC .............. *G11B 27/36* (2013.01); *G06V 10/62* (2022.01); *G06V 10/7715* (2022.01);
(Continued)

(58) Field of Classification Search
CPC ....... G11B 27/36; G11B 27/031; G11B 27/34; G06V 10/7715; G06V 20/46; G06V 10/62
See application file for complete search history.

(56) References Cited

U.S. PATENT DOCUMENTS 8,582,956 B1 * 11/2013 Hegde ............... G11B 27/3027 386/285
2016/0212501 A1 7/2016 Master et al.
(Continued)

FOREIGN PATENT DOCUMENTS

CN 108319444 A 7/2018
CN 109451154 A 3/2019
(Continued)

OTHER PUBLICATIONS

International Search Report for corresponding application PCT/CN2023/080357 filed Mar. 8, 2023; Mail date May 31, 2023.
(Continued)

*Primary Examiner* — Mishawn N. Hunter
(74) *Attorney, Agent, or Firm* — CANTOR COLBURN LLP

(57) ABSTRACT

Provided in an embodiment of the present disclosure is a data processing method, including: determining a trigger point sequence according to a first multimedia file, wherein the trigger point sequence includes at least one control trigger point; determining a control instruction corresponding to each of control trigger points, wherein the control instruction is used for cooperating with the first multimedia file to control a controlled device; and generating a companion program according to the trigger point sequence and the control instruction corresponding to each of the control trigger points. Further provided in the embodiments of the present disclosure are a control apparatus, an electronic device, and a computer readable medium.

19 Claims, 6 Drawing Sheets

(51) Int. Cl.

| | |
|---|---|
| ***G06V 10/77*** | (2022.01) |
| ***G06V 20/40*** | (2022.01) |
| ***G11B 27/031*** | (2006.01) |
| ***G11B 27/34*** | (2006.01) |

(52) U.S. Cl.
CPC ............ *G06V 20/46* (2022.01); *G11B 27/031* (2013.01); *G11B 27/34* (2013.01)

(56) References Cited

U.S. PATENT DOCUMENTS

2020/0380263 A1* 12/2020 Yang ........................ G06F 18/22
2022/0038776 A1* 2/2022 Ghavami ......... H04N 21/26603

FOREIGN PATENT DOCUMENTS

| | | | |
|---|---|---|---|
| CN | 110062272 | A | 7/2019 |
| CN | 110087114 | A | 8/2019 |
| CN | 113542891 | A | 10/2021 |
| CN | 113784171 | A | 12/2021 |
| WO | 2022000983 | A1 | 1/2022 |

OTHER PUBLICATIONS

European Search Report for Application No. 23822693.0, dated Sep. 11, 2025, 10 pages.

* cited by examiner

DATA PROCESSING METHOD, CONTROL APPARATUS, ELECTRONIC DEVICE, AND COMPUTER-READABLE MEDIUM

CROSS-REFERENCE TO RELATED APPLICATION

This disclosure is a national stage filing under 35 U.S.C. § 371 of international application number PCT/CN2023/080357, filed on Mar. 8, 2023, which is based upon and claims the benefit of priority from Chinese Patent Application No. 202210662421.5, filed on Jun. 13, 2022, the entire disclosure of which is incorporated herein by reference.

TECHNICAL FIELD

The embodiments of the present disclosure relate to the field of data processing technologies, and in particular, to a data processing method, a control apparatus, an electronic device, and a computer readable medium.

BACKGROUND

With the development of multimedia technologies, multimedia technologies such as Virtual Reality (VR) and Augmented Reality (AR) are widely applied, and the demand for interaction based on multimedia such as video and audio is continuously increased. In order to realize interaction based on video and audio, it is necessary to control external devices to simulate an authentic immersive experience for users and to provide real-time interactive responses while playing back multimedia files such as video and audio.

In some related technologies, the control functions that can be implemented for the external devices are simple and limited, and the real-time responsiveness of the external devices and the consistency with multimedia files are poor, failing to meet the requirements of users.

SUMMARY

The embodiments of the present disclosure relate to a data processing method, a control apparatus, an electronic device, and a computer readable medium.

Provided in an embodiment of the present disclosure is a data processing method, including: a trigger point sequence is determined according to a first multimedia file, wherein the trigger point sequence includes at least one control trigger point; a control instruction corresponding to each of control trigger points is determined, wherein the control instruction is used for cooperating with the first multimedia file to control a controlled device; and a companion program is generated according to the trigger point sequence and the control instruction corresponding to each of the control trigger points.

Provided in an embodiment of the present disclosure is a control apparatus, including: a storage unit, storing a companion program generated by the data processing method according to the first aspect of the embodiments of the present disclosure; and a processing unit, capable of executing the companion program stored in the storage unit to control a controlled device.

Provided in an embodiment of the present disclosure is a computer readable medium, storing a companion program generated by the data processing method according to the first aspect of the embodiments of the present disclosure.

Provided in an embodiment of the present disclosure is an electronic device, including: one or more processors; a memory, storing one or more programs which, when executed by the one or more processors, cause the one or more processors to implement the data processing method according to the first aspect of the embodiments of the present disclosure; and one or more I/O interfaces, connected between the processor and the memory, and configured to implement information exchange between the processor and the memory.

Provided in an embodiment of the present disclosure is a computer readable medium, storing a computer program which, when executed by a processor, implements the data processing method according to the first aspect of the embodiments of the present disclosure.

DETAILED DESCRIPTION OF THE EMBODIMENTS

In order to make persons skilled in the art better understand the technical solutions of the present disclosure, the data processing method, the control apparatus, the electronic device, and the computer readable medium provided in the embodiments of the present disclosure are described in detail below with reference to the drawings.

Exemplary embodiments will be described more fully hereinafter with reference to the drawings, but may be embodied in various forms and should not be construed as limited to the embodiments set forth herein. Rather, these embodiments are provided such that the present disclosure will be thorough and complete, and will fully convey the scope of the present disclosure to those skilled in the art.

The embodiments of the present disclosure and the features in the embodiments may be combined with each other without conflict.

As used herein, the term "and/or" includes any and all combinations of one or more of the associated listed items.

The terminology used herein is for the purpose of describing particular embodiments only and is not intended to limit the present disclosure. As used herein, the singular forms "a/an" and "the" are intended to include the plural forms as well, unless the context clearly indicates otherwise. It will be further understood that the terms "include" and/or "made of", when used in this description, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art. It will also be understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 1:
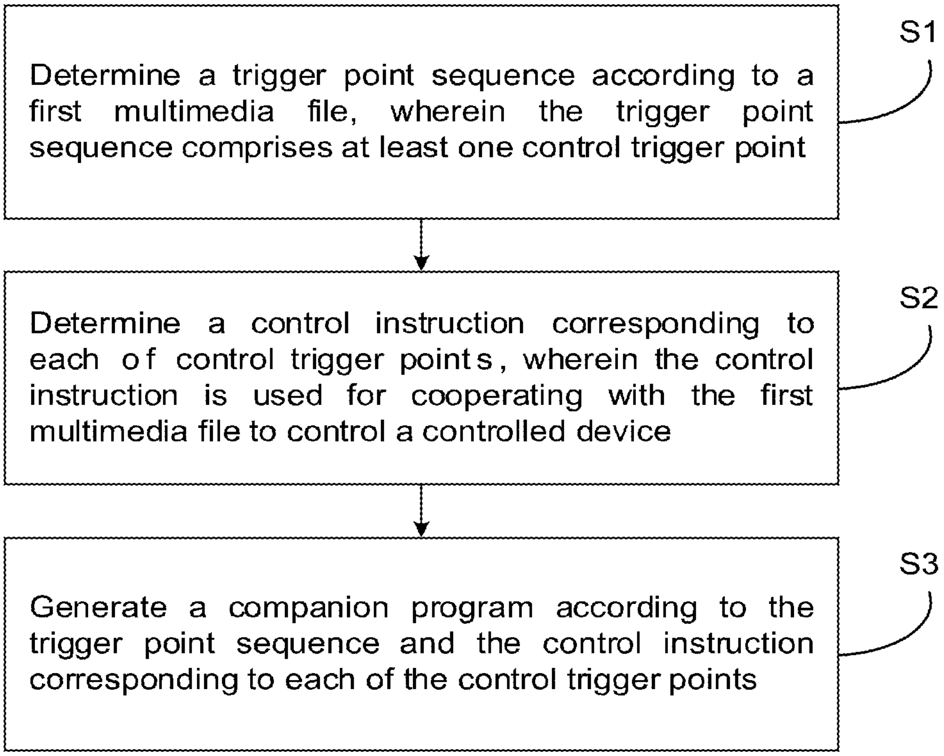
FIG. 1 is a flowchart of a data processing method according to an embodiment of the present disclosure.

Referring to FIG. 1, provided in an embodiment of the present disclosure is a data processing method, including:

S1. a trigger point sequence is determined according to a first multimedia file, wherein the trigger point sequence includes at least one control trigger point;

S2. a control instruction corresponding to each of control trigger points is determined, wherein the control instruction is used for cooperating with the first multimedia file to control a controlled device; and S3. a companion program is generated according to the trigger point sequence and the control instruction corresponding to each of the control trigger points.

It should be noted that, in the embodiments of the present disclosure, both the first multimedia file and the second multimedia file are multimedia files. "First" and "second" are only used to distinguish different multimedia files.

In the embodiments of the present disclosure, the multimedia file may be any one of an audio file, a video file, VR, AR, and the like. The embodiments of the present disclosure are not particularly limited thereto.

In the embodiments of the present disclosure, the controlled device is also referred to as a peripheral device, and the embodiments of the present disclosure do not particularly limit the controlled device. In some embodiments, the controlled device refers to a device that can cooperate with the playback of the multimedia file to provide a user with sensory stimuli, interactive responses, and the like. For example, the controlled device is a vibration motor, which can provide a user with sensory stimuli by vibrating in response to the content of the multimedia file played back.

In the embodiments of the present disclosure, the control trigger point corresponds to a feature point that requires cooperation of the controlled device in the first multimedia file. The control instruction corresponding to a control trigger point is used for cooperating with the first multimedia file to control the controlled device. For example, in cooperation with the playback of the first multimedia file, the controlled device is controlled by execution of the control instruction to provide a corresponding sensory stimulus for the user.

In the embodiments of the present disclosure, a companion program generated according to the trigger point sequence and the control instruction corresponding to each control trigger point is used as an add-on program of the multimedia file. For example, the companion program is executed while the multimedia file is being played back, at least one control trigger point forming a trigger point sequence and a control instruction corresponding to each control trigger point are encapsulated in the companion program, and when the multimedia file is played back to a feature point which requires cooperation of the controlled device, the companion program executes the control instruction of the control trigger point corresponding to the feature point, and controls the controlled device to execute corresponding processing.

In the data processing method according to the embodiment of the present disclosure, a trigger point sequence including at least one control trigger point is determined according to the multimedia file, a control instruction corresponding to each control trigger point and used for cooperating with the multimedia file to control the controlled device is then determined, and finally a companion program is obtained; and when the companion program is used as an add-on program of the multimedia file, the companion program can control the controlled device in cooperation with the playback of the multimedia file. The companion program is edited in the form of an add-on program, such that more and more complex control instructions can be set in the companion program, facilitating more complex control over peripherals, thereby providing richer peripheral functions for users. The cooperation between the edited companion program with the playback of a multimedia file to control the peripherals further allows for ensuring consistency between the playback of multimedia and the response of the peripherals, thereby improving user experience.

The embodiments of the present disclosure do not particularly limit how to determine the trigger point sequence according to the multimedia file.

In some embodiments, the trigger point sequence is determined on the basis of the time line of the multimedia file in accordance with the content of the multimedia file.

Figure 2:
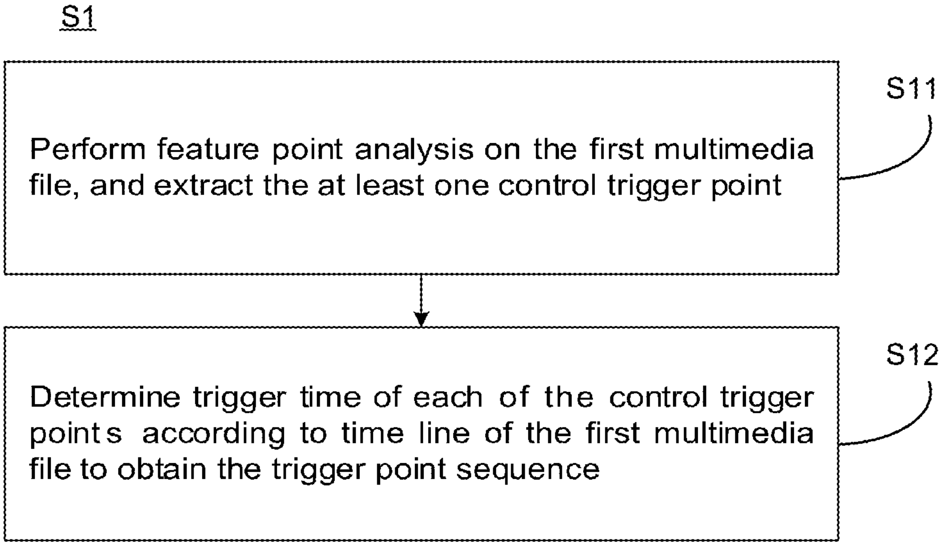
FIG. 2 is a flowchart of some steps of another data processing method according to an embodiment of the present disclosure.

Accordingly, in some embodiments, referring to FIG. 2, the step that a trigger point sequence is determined according to a first multimedia file includes:

S11. feature point analysis is performed on the first multimedia file, and the at least one control trigger point is extracted; and S12. trigger time of each of the control trigger points is determined according to time line of the first multimedia file to obtain the trigger point sequence.

In the embodiments of the present disclosure, performing feature point analysis on the first multimedia file refers to extracting a feature point which requires cooperation of the controlled device in the multimedia file. In some embodiments, the first multimedia file is a video file, and the extracted feature point which requires cooperation of the controlled device is a key frame in the video file. In some embodiments, the first multimedia file is a multimedia file other than the video file, and the extracted feature point which requires cooperation of the controlled device is a key frame in the multimedia file. The embodiments of the present disclosure are not particularly limited thereto. The extracted control trigger point corresponds to a feature point obtained from feature analysis on the first multimedia file.

In the embodiments of the present disclosure, the multimedia analysis software may be used to analyze the first multimedia file, and extract a key frame or key point; Artificial Intelligence (AI) may also be used to analyze the first multimedia file, and extract a key frame or key point. The embodiments of the present disclosure are not particularly limited thereto.

In some embodiments, determining trigger time of each control trigger point according to the time line of the first multimedia file refers to checking the control trigger points with the content of the first multimedia file, for example, checking by means of key frames or key points, and performing time sequence alignment according to the time line of the first multimedia file on the control trigger points for controlling the controlled device. In this way, the time sequence of the control trigger points is consistent with the time line of the first multimedia file, thereby achieving an optimal trigger time sequence matching the content of the first multimedia file.

The determined trigger time of the control trigger points forms a control time axis. When the companion program is used as an add-on program of the media file, the companion program is executed on the basis of the control time axis, such that a corresponding control instruction can be triggered to control the controlled device when the multimedia file is played back to a time point requiring cooperation of the controlled device. In this way, consistency between the playback of multimedia and the response of the peripherals can be ensured, thereby improving user experience.

The embodiments of the present disclosure do not particularly limit how to determine the control instruction corresponding to each control trigger point.

Figure 3:
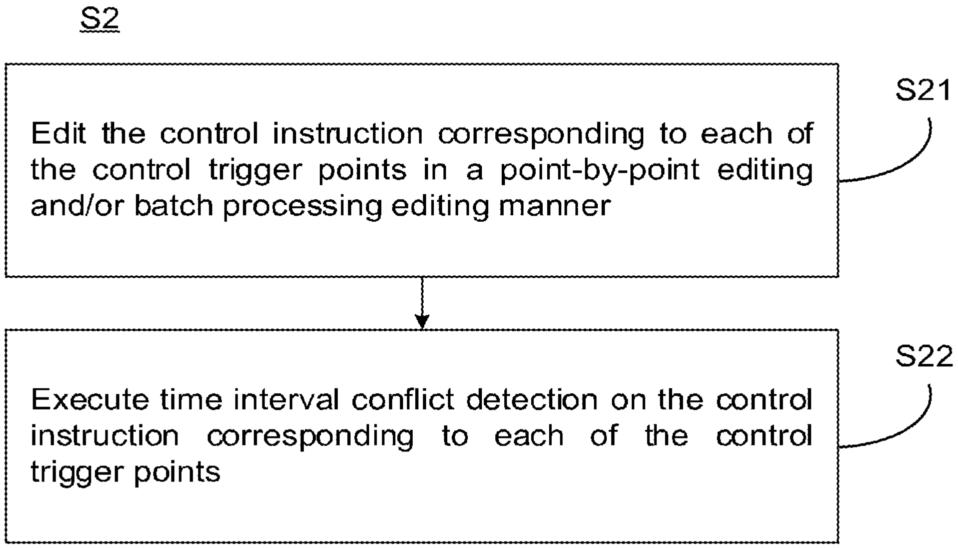
FIG. 3 is a flowchart of some steps of still another data processing method according to an embodiment of the present disclosure.

In some embodiments, referring to FIG. 3, the step that a control instruction corresponding to each of control trigger points is determined includes:

S21. the control instruction corresponding to each of the control trigger points is edited in a point-by-point editing and/or batch processing editing manner; and S22. time interval conflict detection is executed on the control instruction corresponding to each of the control trigger points.

In the embodiments of the present disclosure, the control instruction corresponding to each control trigger point is edited in a point-by-point editing and/or batch processing editing manner, such that a controlled device triggered by a multimedia file has complex control actions, thereby enriching the sensory stimulation effects achieved in cooperation with the multimedia file.

In some embodiments, performing time interval conflict detection on the control instruction corresponding to each control trigger point refers to analyzing a time duration for the controlled device to execute a control action and time intervals with two adjacent control trigger points, so as to ensure that the time duration for the controlled device to execute the control action does not conflict with the time intervals with two adjacent control trigger points.

In the embodiments of the present disclosure, the same time point may correspond to one control trigger point, and may also correspond to a plurality of control trigger points. That is, among the plurality of control trigger points, the trigger time of different control trigger points may be different, or the trigger time of several control trigger points is the same. The embodiments of the present disclosure are not particularly limited thereto.

In the embodiments of the present disclosure, when the same time period corresponds to a plurality of control trigger points, a corresponding control instruction may be set separately for each control trigger point, such that a plurality of control instructions are triggered at the same time point; alternatively, the control instructions corresponding to the control trigger points may be integrated into one composite control instruction, such that one composite control instruction is triggered at the same time point. The embodiments of the present disclosure are not particularly limited thereto.

Accordingly, in some embodiments, the step that the control instruction corresponding to each of the control trigger point is edited includes:

when one time point corresponds to a plurality of the control trigger points, a composite control instruction corresponding to the time point is generated according to control instructions corresponding to the plurality of the control trigger points.

The plurality of control instructions corresponding to the same time point are integrated into one composite control instruction, thereby being beneficial to avoid system complexity, ensuring a unique time line, and improving the reliability of the time line.

Figure 4:
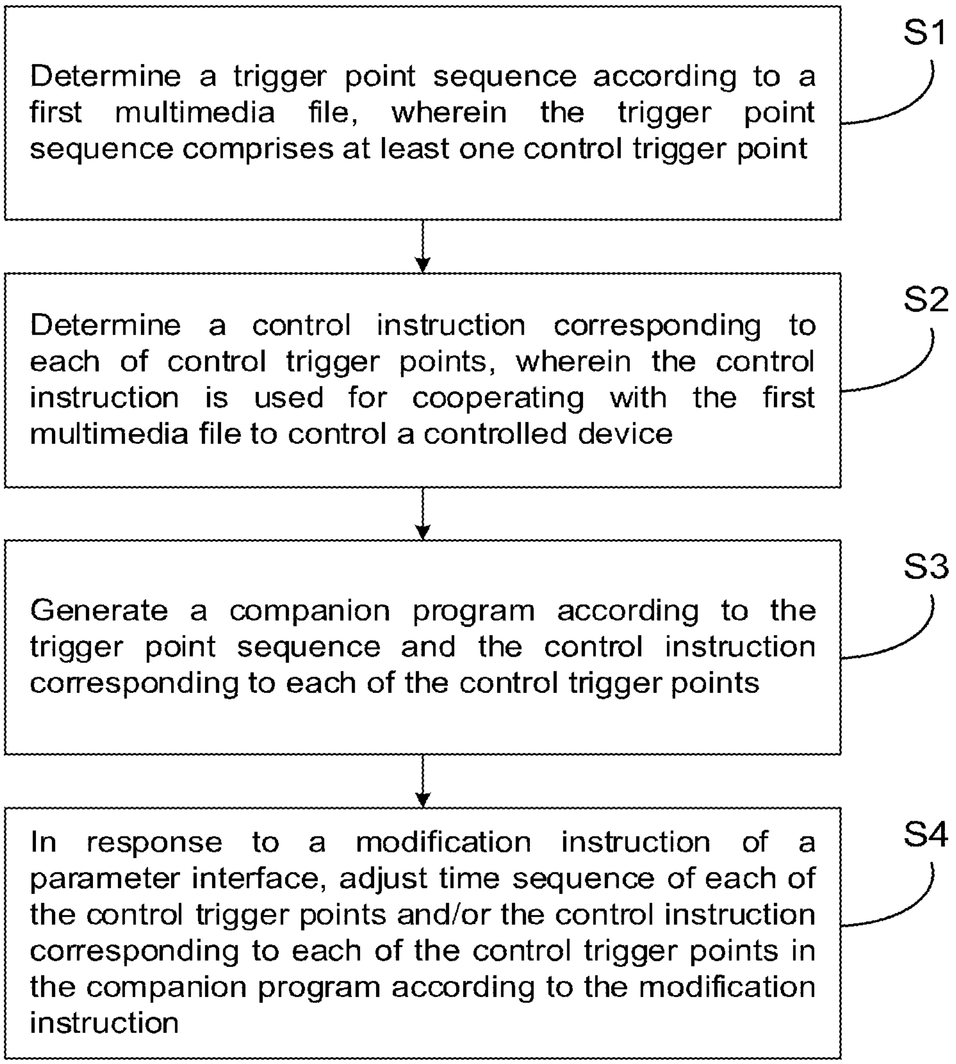
FIG. 4 is a flowchart of some steps of yet another data processing method according to an embodiment of the present disclosure.

In some embodiments, referring to FIG. 4, the data processing method further includes:

S4. in response to a modification instruction of a parameter interface, time sequence of each of the control trigger points and/or the control instruction corresponding to each of the control trigger points in the companion program are/is adjusted according to the modification instruction.

In the embodiments of the present disclosure, a parameter interface for adjusting the companion program is reserved in the packaged companion program.

In the embodiments of the present disclosure, at least one of the time sequence of the control trigger points in the companion program and the control instructions corresponding to the control trigger points can be adjusted. The embodiments of the present disclosure are not particularly limited thereto.

In the embodiments of the present disclosure, adjusting the time sequence of the control trigger points in the companion program refers to adjusting the trigger time of the control trigger points.

In the embodiments of the present disclosure, during the generation of the companion program, the user may debug and calibrate the companion program via the parameter interface. For example, the user finely adjusts the control time axis in the companion program according to the user's feeling to achieve optimal matching of the personal feeling. Alternatively, after the companion program is generated, the user may adjust and set the companion program in a personalized manner. For example, control instructions are added or modified in the companion program, and peripheral functions are added, so as to satisfy personalized and diversified requirements of the user. The embodiments of the present disclosure are not particularly limited thereto.

In some embodiments, a User Interface (UI) is provided for a user, which is used for adjusting the time sequence of the control trigger points in the companion program and the control instructions corresponding to the control trigger points.

In the embodiments of the present disclosure, a parameter interface for modifying a companion program is provided in the companion program, such that the companion program can be re-edited, thereby satisfying personalized and diversified requirements of the user for peripheral functions, and facilitating network communications at the same time.

In the embodiments of the present disclosure, the companion program generated on the basis of the first multimedia file may also be applied to multimedia files having the same content but in different versions.

Figure 5:
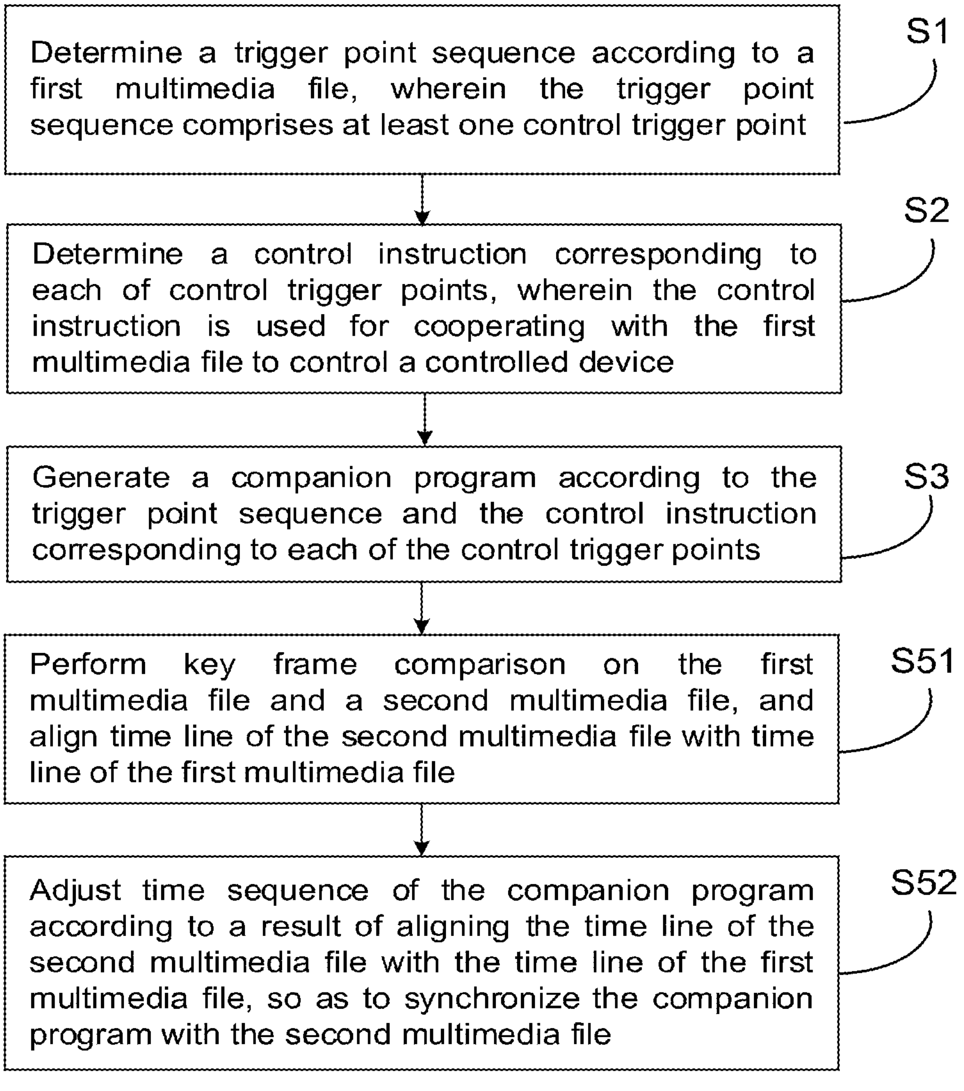
FIG. 5 is a flowchart of some steps of yet another data processing method according to an embodiment of the present disclosure.

In some embodiments, referring to FIG. 5, the data processing method further includes:

S51. key frame comparison is performed on the first multimedia file and a second multimedia file, and time line of the second multimedia file is aligned with time line of the first multimedia file, wherein the first multimedia file and the second multimedia file are different versions of one multimedia file; and S52. time sequence of the companion program is adjusted according to a result of aligning the time line of the second multimedia file with the time line of the first multimedia file, so as to synchronize the companion program with the second multimedia file.

In the embodiments of the present disclosure, the first multimedia file and the second multimedia file have the same content but in different versions. For example, some video files have advertisements embedded or different openings added, resulting in different versions of the video files. The time lines for different versions of the multimedia files are usually inconsistent.

In the embodiments of the present disclosure, adjusting the time sequence of the control trigger points in the companion program refers to adjusting the trigger time of the control trigger points.

In some embodiments, the time line of the second multimedia file is aligned with the time line of the first multimedia file, thereby aligning the time of the feature of the first multimedia file with that of the second multimedia file; the companion program is synchronized with the second multimedia file, such that the control time axis of the companion program corresponds to the feature content of the second multimedia file, achieving an accurate time sequence state of the feature content of the second multimedia file relative to the companion program.

In the embodiments of the present disclosure, the multimedia playback terminal and the controlled device can be interconnected via wires, and can also be interconnected wirelessly. The embodiments of the present disclosure are not particularly limited thereto.

In the embodiments of the present disclosure, the edited companion program may be stored in the multimedia playback terminal or in the controlled device. The embodiments of the present disclosure are not particularly limited thereto. It should be noted that storing the companion program in the multimedia playback terminal facilitates the user modifying and adjusting the companion program; storing the companion program in the controlled device facilitates ensuring that the controlled device operates stably.

Figure 6:
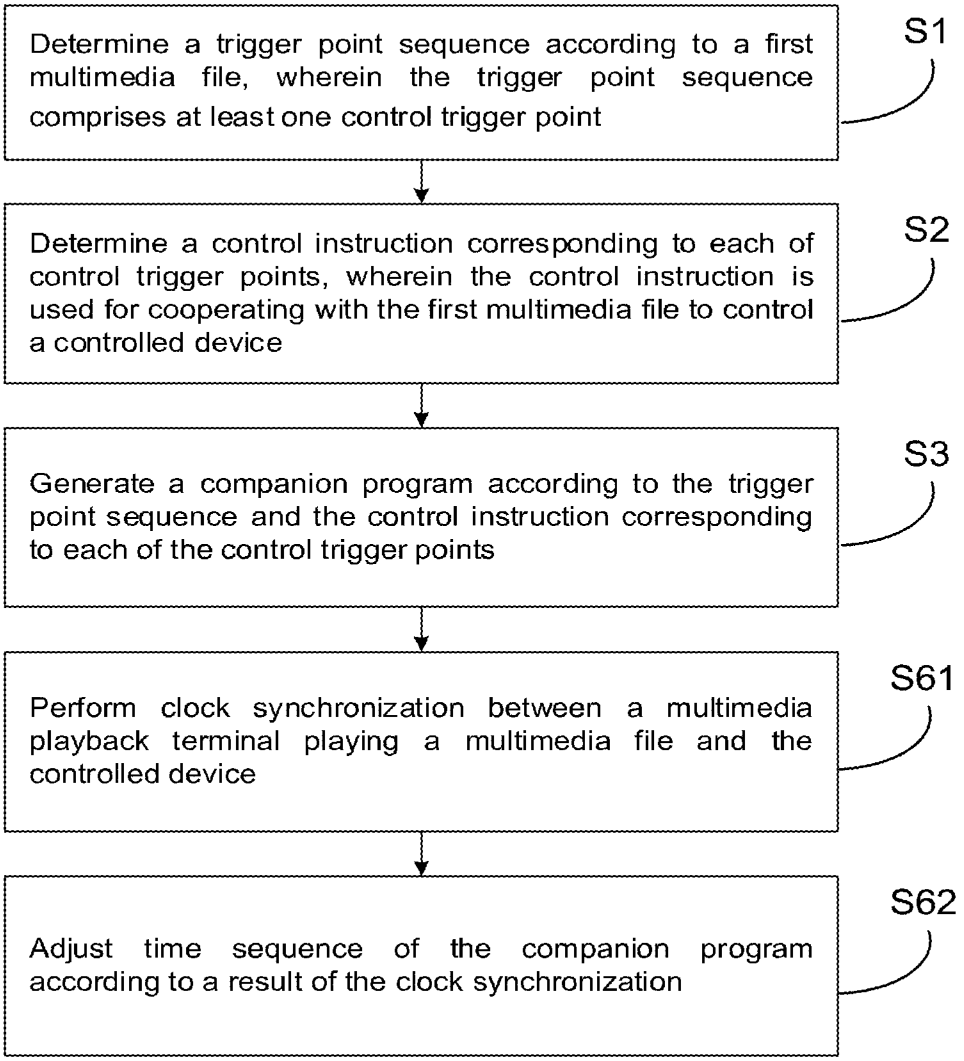
FIG. 6 is a flowchart of some steps of yet another data processing method according to an embodiment of the present disclosure.

In some embodiments, referring to FIG. 6, after the step that a companion program is generated according to the trigger point sequence and the control instruction corresponding to each of the control trigger points, the data processing method further includes:

S61. clock synchronization is performed between a multimedia playback terminal playing a multimedia file and the controlled device; and S62. time sequence of the companion program is adjusted according to a result of the clock synchronization.

In the embodiments of the present disclosure, adjusting the time sequence of the control trigger points in the companion program refers to adjusting the trigger time of the control trigger points.

In some embodiments, a plurality of controlled devices are included, and in a companion program, different controlled devices correspond to different control instructions. The communication delay between different controlled devices and the multimedia playback terminal may be the same or different. After clock synchronization is performed between the multimedia playback terminal playing back the multimedia file and the controlled device, the trigger time of the control trigger points corresponding to each controlled device in the companion program needs to be adjusted, that is, the time sequence of the companion program is adjusted according to the clock synchronization result.

In the embodiments of the present disclosure, when the companion program is used as an add-on program of the multimedia file to control the controlled device, clock synchronization is performed between the multimedia playback terminal and the controlled device, such that a delay caused by communication can be avoided, ensuring consistency between the playback of multimedia and the response of the peripherals, thereby improving user experience.

In some embodiments, the multimedia playback terminal has sensors such as a distance sensor, an acoustic sensor, an optical sensor, and an electrical sensor, and the trigger point sequence is determined according to the sensor.

In some embodiments, the step that a trigger point sequence is determined according to a first multimedia file includes:

The at least one control trigger point is determined according to a value of a sensor of a multimedia playback terminal playing a multimedia file.

In some embodiments, the step that the at least one control trigger point is determined according to a value of a sensor of a multimedia playback terminal playing a multimedia file includes:

for any sensor, one control trigger point is configured corresponding to each threshold of the sensor's value, wherein the sensor is provided with at least one threshold.

In the embodiments of the present disclosure, the trigger point sequence may be determined on the basis of the time line of the multimedia file only according to the content of the multimedia file; the trigger point sequence may also be determined only according to the sensor; the trigger point sequence may also be determined on the basis of the time line of the multimedia file not only according to the content of the multimedia file but also according to the sensor. The embodiments of the present disclosure are not particularly limited thereto.

In the embodiments of the present disclosure, determining a trigger point sequence on the basis of the time line and/or the sensor allows for adaptation to more complex scenarios, thereby providing more authentic experience for users.

Figure 7:
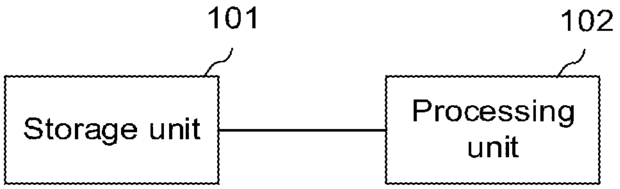
FIG. 7 is a block diagram of a control apparatus according to an embodiment of the present disclosure.

Referring to FIG. 7, provided in an embodiment of the present disclosure is a control apparatus, including:

a storage unit 101, storing the companion program generated by the data processing method according to the first aspect of the embodiments of the present disclosure; and a processing unit 102, capable of executing the companion program stored in the storage unit 101 to control the controlled device.

Figure 8:
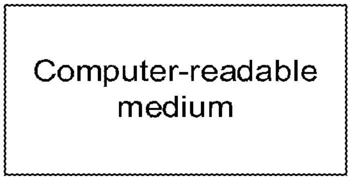
FIG. 8 is a block diagram of a computer readable medium according to an embodiment of the present disclosure.

Referring to FIG. 8, provided in an embodiment of the present disclosure is a computer readable medium, storing the companion program generated by the data processing method according to the first aspect of the embodiments of the present disclosure.

Figure 9:
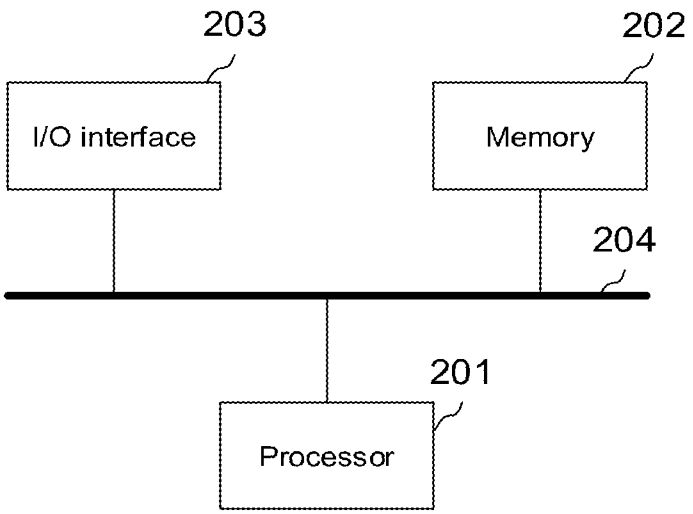
FIG. 9 is a block diagram of an electronic device according to an embodiment of the present disclosure.

Referring to FIG. 9, provided in an embodiment of the present disclosure is an electronic device, including:

one or more processors 201;

a memory 202, storing one or more programs which, when executed by the one or more processors, cause the one or more processors to implement the data processing method according to the first aspect of the embodiments of the present disclosure; and one or more input and output (I/O) interfaces 203, connected between the processor and the memory, and configured to implement information exchange between the processor and the memory.

The processor 201 is a device having a data processing capability, and includes, but is not limited to, a Central Processing Unit (CPU), and the like; the memory 202 is a device having a data storage capability, and includes, but is not limited to, a Random Access Memory (RAM, more specifically, SDRAM, DDR, and the like), a Read-Only Memory (ROM), an Electrically Erasable Programmable Read-Only Memory (EEPROM), and a Flash Memory (FLASH); the I/O interface (read/write interface) 203 is connected between the processor 201 and the memory 202, and can implement information exchange between the processor 201 and the memory 202; and the I/O interface includes, but is not limited to, a Data Bus (Bus), and the like.

In some embodiments, the processor 201, the memory 202, and the I/O interface 203 are interconnected via a bus 204, and then connected to other components of a computing device.

Figure 10:
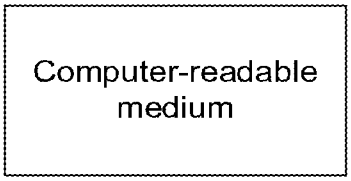
FIG. 10 is a block diagram of a computer readable medium according to an embodiment of the present disclosure.

Referring to FIG. 10, provided in an embodiment of the present disclosure is a computer readable-medium, storing a computer program which, when executed by a processor, implements the data processing method according to the first aspect of the embodiments of the present disclosure.

In order to make those skilled in the art understand the technical solutions provided in the embodiments of the present disclosure more clearly, the technical solutions provided in the embodiments of the present disclosure will be described in detail below by means of specific embodiments:

Embodiment I

This embodiment provides a peripheral control system accompanying multimedia playback, including:

1) Control Trigger Point Establishment System a. Video image or audio feature points of multimedia are analyzed by means of image or audio analysis software, control trigger points requiring cooperation of peripherals are extracted, and a relative time relationship between various control trigger points is accurately compared.

b. The extracted control trigger points are checked with multimedia content (by means of time points of video key frames), and time sequence calibration is performed on the control trigger points according to the time line of the multimedia by means of time sequence correction, so as to achieve an optimal trigger time sequence matching the multimedia content, and the unified time line of the multimedia and the control time sequence is outputted.

2) Control Content Editing System for Key Points a. For the editing of a specific control instruction of each control trigger point, point-by-point editing can be performed, and classified batch processing editing can also be performed; these editing works allow the peripheral triggered by multimedia content to have complex control actions, achieving a multi-sensory stimulation effect in cooperation with the multimedia content.

b. The time length of the peripheral cooperation action and two adjacent trigger time intervals of the control trigger point are analyzed, so as to ensure that the peripheral cooperation time does not conflict with the interval times; the peripheral control involving composite multi-instruction multi-action can be realized by means of single control trigger point editing, instead of being realized by triggering a plurality of control flows at one time point, thereby avoiding increasing the system complexity and ensuring the uniqueness and reliability of the time line.

c. After control editing and time interval analysis are completed, a control program is packaged to obtain a companion program which is used as an add-on program for multimedia playback in cooperation with the customized multimedia content.

d. A parameter interface allowing for adjustment of the time sequence and the control program is reserved in the packaged companion program, such that a user can perform personalized adjustment and setting on the companion program for multimedia content during playback.

3) Companion Program Packaging and Internet Interaction System a. For the same multimedia content product, different versions may circulate online, with some videos having advertisements embedded or different openings added, such that the time line of an initially edited control program cannot match these versions one by one; therefore, key frames of videos of different versions need to be compared, and the time of the feature content is calibrated to be consistent by means of a forward shift or backward shift operation.

b. The time line of the companion program corresponds to the checked multimedia content to achieve an accurate time sequence state of the multimedia content relative to the original companion program.

4) Companion Program and Peripheral Interconnection System a. Peripheral and program interconnection can adopt various modes, which may be wired interconnection, and may also be wireless interconnection. The already written companion program may be stored in a multimedia playback terminal or downloaded to a buffer of the controlled peripheral in advance; this selection is mainly to satisfy the convenience and speed of users, and in theory, the remote control of multimedia is mainly to facilitate the modification of programs, the download to the controlled peripheral is mainly for the stable operation of the peripheral without being interfered by the communication process; however, the controlled device also needs to be clock synchronized with the multimedia control terminal to ensure that no time sequence error exists during working.

b. The peripheral can be provided with time sequence adjustment control, and the delay problems caused by the communication between the companion program and the peripheral are balanced by means of forward or backward shifts of time sequence.

Embodiment II

There are many peripheral applications as videos accompanies, which mainly provide multimedia audiences with multi-sensory stimulation scenarios. In this embodiment, multiple groups of controllable vibration motors are taken as an example, and multimedia content requiring stimulation is responded by vibration of the multiple groups of motors. However, this embodiment is not limited to such products.

The controllable motor multimedia companion system includes four functional module systems:

1. control key point establishment system;
2. control content editing system for key points;
3. control program packaging and Internet interaction system; and 4. control program and peripheral interconnect system.

In this embodiment, the video media is only an example, and this embodiment includes various types of multimedia playback streaming media such as video, audio, VR animation, and AR visual effect. The product of this embodiment is an add-on companion playback plug-in of these multimedia, and is mainly responsible for controlling and modifying other sensing devices.

In this embodiment, the step of manual or AI identification of key points may also calibrate the alignment of the subsequent video time axis and the time axis of the companion plug-in file, for example, the capture of a multimedia key frame is set, such that a similar point of the key frame can be quickly found when compared with other videos having the same name, and the time axis of videos having the same name is derived, and compared with the standard video to align the time axis.

After the key frame is identified, a control time axis can be formed systematically by combination by means of this embodiment, and the time axis is used as a control sequence to control a corresponding response module accompanying the playback of multimedia. Furthermore, an adjustable window for a time point of a time axis is configured on a UI for controlling the fine adjustment setting of trigger time points.

In this embodiment, motors are used to provide control in response to key frames, but in more complex VR and AR experience scenarios, there are actually more applications. For example, the playback system may have sensors (distance, acoustic, optical or electrical sensors) and the like, which can also trigger the implementation of the control program. In such composite scenarios, the time axis or the key frame is not the only trigger logic, and its purpose is also to produce more authentic experience for users. Time key frames are the main trigger control logic in a multimedia playback and viewing scenario, but in a VR game scenario with interactive experience, a companion program that provides control logic for a threshold of a sensor may provide authentic responses for games in many dimensions in an add-on form.

This embodiment relates to a companion playback plug-in system independent of multimedia content, which can edit the time axis according to the multimedia content to control a trigger flow to control a peripheral control system beneficial to multimedia interaction experience.

This embodiment includes multimedia key point or key frame identification, recording and editing system, which can change a multimedia interaction task into a time axis control file containing matched multimedia content, and embed complex control actions into the companion playback file.

This embodiment includes a time axis adjustment system. Because there are many versions of multimedia content circulating on the market, content such as advertisements of a compressor may be embedded to the opening, ending or middle of some multimedia, resulting in the inconsistency of time axes between many versions of the same multimedia. This embodiment includes a key frame matching function, which can align the key frame time axes of multiple versions of multimedia files, so as to control the files to be synchronized with the multimedia content.

The companion playback plug-in also provides a manual adjustment interface for modification of the time axis and control action, and users may also manually and finely adjust the time axis according to his/her own feeling to achieve optimal matching of the personal feeling. Furthermore, the companion playback plug-in can be packaged into a plug-in file for communication over a network.

Those of ordinary skill in the art can appreciate that the functional blocks/units in all or some of the steps, systems, and apparatuses of the methods disclosed above can be implemented as software, firmware, hardware, and any suitable combination thereof. In a hardware implementation, the division between functional modules/units referred to in the above description does not necessarily correspond to the division of physical components; for example, one physical component may have multiple functions, or one function or step may be cooperatively performed by several physical components. Some or all of the physical components may be implemented as software executed by a processor, such as a central processing unit, digital signal processor, or microprocessor, or as hardware, or as an integrated circuit, such as an application specific integrated circuit. Such software may be distributed on a computer readable-medium, which may include a computer storage medium (or non-transitory medium) and a communication medium (or transitory medium). As is well known to those of ordinary skill in the art, the term "computer storage medium" includes both volatile and nonvolatile, removable and non-removable media implemented in any method or technology for storage of information such as computer readable instructions, data structures, program modules, or other data. The computer storage medium includes, but is not limited to, RAM, ROM, EEPROM, flash memory or other memory technology, CD-ROM, Digital Versatile Disc (DVD) or other optical disk storage, magnetic cassette, magnetic tape, magnetic disk storage or other magnetic storage devices, or any other medium which can be used to store the desired information and which can be accessed by a computer. In addition, a communication medium typically includes computer readable instructions, data structures, program modules, or other data in a modulated data signal such as a carrier or other transport mechanism and may include any information delivery medium as is known to those of ordinary skill in the art.

Exemplary embodiments have been disclosed herein, and while specific terms are employed, they are used and should be interpreted in a generic and descriptive sense only and not for purposes of limitation. In some instances, as would be apparent to one of skill in the art, features, characteristics, and/or elements described in conjunction with a particular embodiment may be used alone or in combination with features, characteristics, and/or elements described in conjunction with other embodiments unless specifically indicated otherwise. It will thus be understood by those skilled in the art that various changes in form and details may be made therein without departing from the scope of the present disclosure as set forth in the appended claims.

What is claimed is:

1. A data processing method, comprising:

determining a trigger point sequence according to a first multimedia file, wherein the trigger point sequence comprises at least one control trigger point;

determining a control instruction corresponding to each of control trigger points, wherein the control instruction is used for cooperating with the first multimedia file to control a controlled device; and generating a companion program according to the trigger point sequence and the control instruction corresponding to each of the control trigger points;

wherein determining a control instruction corresponding to each of control trigger points comprises:

editing the control instruction corresponding to each of the control trigger points in a point-by-point editing and/or batch processing editing manner; and executing time interval conflict detection on the control instruction corresponding to each of the control trigger points.

2. The data processing method according to claim 1, wherein determining a trigger point sequence according to a first multimedia file comprises:

performing feature point analysis on the first multimedia file, and extracting the at least one control trigger point; and determining trigger time of each of the control trigger points according to time line of the first multimedia file to obtain the trigger point sequence.

3. The data processing method according to claim 1, wherein editing the control instruction corresponding to each of the control trigger points comprises:

in cases where one time point corresponds to a plurality of the control trigger points, generating a composite control instruction corresponding to the time point according to control instructions corresponding to the plurality of the control trigger points.

4. The data processing method according to claim 1, wherein after generating a companion program according to the trigger point sequence and the control instruction corresponding to each of the control trigger points, the data processing method further comprises:

in response to a modification instruction of a parameter interface, adjusting, according to the modification instruction, time sequence of each of the control trigger points and/or the control instruction corresponding to each of the control trigger points in the companion program.

5. The data processing method according to claim 1, wherein the data processing method further comprises:

performing key frame comparison on the first multimedia file and a second multimedia file, and aligning time line of the second multimedia file with time line of the first multimedia file, wherein the first multimedia file and the second multimedia file are different versions of one multimedia file; and adjusting time sequence of the companion program according to a result of aligning the time line of the second multimedia file with the time line of the first multimedia file, so as to synchronize the companion program with the second multimedia file.

6. The data processing method according to claim 1, wherein after generating a companion program according to the trigger point sequence and the control instruction corresponding to each of the control trigger points, the data processing method further comprises:

performing clock synchronization between a multimedia playback terminal playing a multimedia file and the controlled device; and adjusting time sequence of the companion program according to a result of the clock synchronization.

7. The data processing method according to claim 1, wherein determining a trigger point sequence according to a first multimedia file comprises:

determining the at least one control trigger point according to a value of a sensor of a multimedia playback terminal playing a multimedia file.

8. The data processing method according to claim 7, wherein determining the at least one control trigger point according to a value of a sensor of a multimedia playback terminal playing a multimedia file comprises:

for any sensor, configuring one control trigger point corresponding to each threshold of the sensor's value, wherein the sensor is provided with at least one threshold.

9. A control apparatus, comprising:

a storage unit, storing the companion program generated by the data processing method according to claim 1; and a processing unit, capable of executing the companion program stored in the storage unit to control the controlled device.

10. A non-transitory computer-readable medium, storing the companion program generated by the data processing method according to claim 1.

11. An electronic device, comprising:

one or more processors;

a memory, storing one or more programs which, when executed by the one or more processors, cause the one or more processors to implement the data processing method according to claim 1; and one or more input and output (I/O) interfaces, connected between the one or more processors and the memory, and configured to implement information exchange between the one or more processors and the memory.

12. A non-transitory computer-readable medium, storing a computer program which, when executed by a processor, implements the data processing method according to claim 1.

13. The data processing method according to claim 1, wherein the first multimedia file comprises at least one of: an audio file, a video file, an augmented reality (AR) file or a virtual reality (VR) file.

14. The data processing method according to claim 1, wherein a controlled device refers to a peripheral device.

15. The data processing method according to claim 1, wherein the controlled device refers to a device that can cooperate with a playback of the first multimedia file to provide a user with sensory stimuli or interactive responses.

16. The data processing method according to claim 1, wherein each of the control trigger points corresponds to a feature point that requires cooperation of the controlled device in the first multimedia file, the feature point comprises a key frame or a key point of the first multimedia file.

17. The data processing method according to claim 1, wherein the companion program is used as an add-on program for the first multimedia file, and is used for controlling the controlled device in cooperation with a playback of the first multimedia file.

18. The data processing method according to claim 1, wherein determining a trigger point sequence according to a first multimedia file comprises:

determining the trigger point sequence on the basis of time line of the first multimedia file in accordance with the content of the first multimedia file.

19. The data processing method according to claim 1, wherein performing feature point analysis on the first multimedia file comprises:

performing an analysis on the first multimedia file using multimedia analysis software or artificial intelligence to extract key frames or key points.

* * * * *